(12) United States Patent
Keller et al.

(10) Patent No.: US 6,622,237 B1
(45) Date of Patent: Sep. 16, 2003

(54) STORE TO LOAD FORWARD PREDICTOR TRAINING USING DELTA TAG

(75) Inventors: James B. Keller, Palo Alto, CA (US); Thomas S. Green, Sunnyvale, CA (US); Wei-Han Lien, Sunnyvale, CA (US); Ramsey W. Haddad, Cupertino, CA (US); Keith R. Schakel, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/476,192

(22) Filed: Jan. 3, 2000

(51) Int. Cl.[7] .................................................. G06F 9/00
(52) U.S. Cl. ......................... 712/216; 712/214; 712/23
(58) Field of Search ........................ 712/23, 216, 214, 712/215; 711/159, 118, 156

(56) References Cited

U.S. PATENT DOCUMENTS

| 4,521,851 A | 6/1985 | Trubisky et al. |
| 4,594,660 A | 6/1986 | Guenthner et al. |

(List continued on next page.)

FOREIGN PATENT DOCUMENTS

| EP | 0 709 770 | 5/1996 |
| WO | 97/27538 | 7/1997 |

OTHER PUBLICATIONS

Moshovos et al. "Speculative Memory Cloaking and Bypassing" pp. 1–15 Oct. 1999.*
Moshovos et al. "Streamlining Inter–operation Memory Communication via Data Dependence Prediction" IEEE pp. 1–11 12/97.*
Gopal et al. "Specualtive Versioning Cache" pp. 1–11 Feb. 1998.*
Chrysos et al., "Memory Dependence Prediction using Store Sets," ©1998 IEEE, pp. 142–153.
Moshovos et al., "Dynamic Speculation and Synchronization of Data Dependences," ©1997 ACM, pp. 181–193.
Johnson, *Superscalar Microprocessor Design*, Prentice–Hall, 1991, pp. 127–129.
Gwennap, "Digital 21264 Sets New Standard," Microdesign Resources, vol. 10, No. 14, Oct. 1996, pp. 103–108.

*Primary Examiner*—Larry D. Donaghue
(74) *Attorney, Agent, or Firm*—Lawrence J. Merkel; Meyertons, Hood, Kivlin, Kowert & Goetzel, P.C.

(57) ABSTRACT

A processor employs a store to load forward (STLF) predictor which may indicate, for dispatching loads, a dependency on a store. The dependency is indicated for a store which, during a previous execution, interfered with the execution of the load. Since a dependency is indicated on the store, the load is prevented from scheduling and/or executing prior to the store. The STLF predictor is trained with information for a particular load and store in response to executing the load and store and detecting the interference. Additionally, the STLF predictor may be untrained (e.g. information for a particular load and store may be deleted) if a load is indicated by the STLF predictor as dependent upon a particular store and the dependency does not actually occur. In one implementation, the STLF predictor records at least a portion of the PC of a store which interferes with the load in a first table indexed by the load PC. A second table maintains a corresponding portion of the store PCs of recently dispatched stores, along with tags identifying the recently dispatched stores. In another implementation, the STLF predictor records a difference between the tags assigned to a load and a store which interferes with the load in a first table indexed by the load PC. The PC of the dispatching load is used to select a difference from the table, and the difference is added to the tag assigned to the load.

20 Claims, 10 Drawing Sheets

U.S. PATENT DOCUMENTS

| | | |
|---|---|---|
| 5,404,470 A | 4/1995 | Miyake |
| 5,465,336 A | 11/1995 | Imai et al. |
| 5,467,473 A | 11/1995 | Kahle et al. |
| 5,619,662 A | 4/1997 | Steely, Jr. et al. |
| 5,651,125 A | 7/1997 | Witt et al. |
| 5,710,902 A | 1/1998 | Sheaffer et al. |
| 5,717,883 A | 2/1998 | Sager |
| 5,748,978 A | 5/1998 | Narayan et al. |
| 5,781,752 A | 7/1998 | Moshovos et al. |
| 5,799,165 A | 8/1998 | Favor et al. |
| 5,835,747 A | 11/1998 | Trull |
| 5,884,060 A | 3/1999 | Vegesna et al. |
| 5,884,061 A | 3/1999 | Hesson et al. |
| 5,923,862 A | 7/1999 | Nguyen et al. |
| 5,996,068 A | 11/1999 | Dwyer, III et al. |
| 6,016,540 A | 1/2000 | Zaidi et al. |
| 6,108,770 A * | 8/2000 | Chrysos et al. .............. 712/216 |
| 6,122,727 A | 9/2000 | Witt |
| 6,212,622 B1 | 4/2001 | Witt |
| 6,212,623 B1 | 4/2001 | Witt |
| 6,266,744 B1 * | 7/2001 | Hughes et al. ............... 711/146 |
| 6,393,536 B1 * | 5/2002 | Hughes et al. ............... 711/159 |
| 6,502,185 B1 * | 12/2002 | Keller et al. ................. 712/213 |
| 6,542,984 B1 * | 4/2003 | Keller et al. ................. 712/214 |

* cited by examiner

STORE TO LOAD FORWARD PREDICTOR TRAINING USING DELTA TAG

BACKGROUND OF THE INVENTION

1. Field of the Invention

This invention is related to the field of processors and, more particularly, to store to load forward mechanisms within processors.

2. Description of the Related Art

Processors often include store queues to buffer store memory operations which have been executed but which are still speculative. The store memory operations may be held in the store queue until they are retired. Subsequent to retirement, the store memory operations may be committed to the cache and/or memory. As used herein, a memory operation is an operation specifying a transfer of data between a processor and a main memory (although the transfer may be completed in cache). Load memory operations specify a transfer of data from memory to the processor, and store memory operations specify a transfer of data from the processor to memory. Memory operations may be an implicit part of an instruction which includes a memory operation, or may be explicit load/store instructions. Load memory operations may be more succinctly referred to herein as "loads". Similarly, store memory operations may be more succinctly referred to as "stores".

While executing stores speculatively and queueing them in the store queue may allow for increased performance (by removing the stores from the instruction execution pipeline and allowing other, subsequent instructions to execute), subsequent loads may access the memory locations updated by the stores in the store queue. While processor performance is not necessarily directly affected by having stores queued in the store queue, performance may be affected if subsequent loads are delayed due to accessing memory locations updated by stores in the store queue. Often, store queues are designed to forward data stored therein if a load hits the store queue. As used herein, a store queue entry storing a store memory operation is referred to as being "hit" by a load memory operation if at least one byte updated by the store memory operation is accessed by the load memory operation.

To further increase performance, it is desirable to execute younger loads out of order with respect to older stores. The younger loads may often have no dependency on the older stores, and thus need not await the execution of the older stores. Since the loads provide operands for execution of dependent instructions, executing the loads allows for still other instructions to be executed. However, merely detecting hits in the store queue as loads are executing may not lead to correct program execution if younger loads are allowed to execute out of order with respect to older stores, since certain older stores may not have executed yet (and thus the store addresses of those stores may not be known and dependencies of the loads on the certain older stores may not be detectable as the loads are executed). Accordingly, hardware to detect scenarios in which a younger load executes prior to an older store on which that younger load is dependent may be required, and then corrective action may be taken in response to the detection. For example, instructions may be purged and refetched or reexecuted in some other suitable fashion. As used herein, a load is "dependent" on a store if the store updates at least one byte of memory accessed by the load, is older than the load, and is younger than any other stores updating that byte. Unfortunately, executing the load out of order improperly and the subsequent corrective actions to achieve correct execution may reduce performance.

It is noted that loads, stores, and other instruction operations may be referred to herein as being older or younger than other instruction operations. A first instruction is older than a second instruction if the first instruction precedes the second instruction in program order (i.e. the order of the instructions in the program being executed). A first instruction in younger than a second instruction if the first instruction is subsequent to the second instruction in program order.

SUMMARY OF THE INVENTION

The problems outlined above are in large part solved by a processor as described herein. The processor generally may schedule and/or execute younger loads ahead of older stores. Additionally, the processor may detect and take corrective action for scenarios in which an older store interferes with the execution of the younger load. The processor employs a store to load forward (STLF) predictor which may indicate, for dispatching loads, a dependency on a store. The dependency is indicated for a store which, during a previous execution, interfered with the execution of the load. Since a dependency is indicated on the store, the load is prevented from scheduling and/or executing prior to the store. Performance may be increased due to the decreased interference between loads and stores.

The STLF predictor is trained with information for a particular load and store in response to executing the load and store and detecting the interference. Additionally, the STLF predictor may be untrained (e.g. information for a particular load and store may be deleted) if a load is indicated by the STLF predictor as dependent upon a particular store and the dependency does not actually occur. For example, in one embodiment, the STLF predictor is untrained if the load is indicated as dependent upon the particular store but store data is not forwarded from a store queue within the processor when the load executes.

In one implementation, the STLF predictor records at least a portion of the PC of a store which interferes with the load in a first table indexed by the load PC. A second table maintains a corresponding portion of the store PCs of recently dispatched stores, along with tags identifying the recently dispatched stores. The PC of a dispatching load is used to select a store PC from the first table. The selected store PC is compared to the PCs stored in the second table. If a match is detected, the corresponding tag is read from the second table and used to indicate a dependency for the load.

In another implementation, the STLF predictor records a difference between the tags assigned to a load and a store which interferes with the load in a first table indexed by the load PC. The PC of the dispatching load is used to select a difference from the table, and the difference is added to the tag assigned to the load. Accordingly, a tag of the store may be generated and a dependency of the load on the store may be indicated.

Broadly speaking, a store to load forward (STLF) predictor is contemplated comprising a dependency table and an adder circuit. The dependency table is configured to store a first value indicative of a number of instruction operations between a first store memory operation and a first load memory operation, wherein the first store memory operation interfered with the first load memory operation during a previous execution. The dependency table is configured to output the first value responsive to receiving a first indication of the first load memory operation. Coupled to receive the first value and a first tag identifying the first load memory operation, the adder circuit is configured to generate, from the first value and the first tag, a second tag identifying the first store memory operation.

Additionally, a processor is contemplated comprising an STLF predictor and a scheduler. The STLF predictor is coupled to receive a first indication of a first load memory operation and a first tag identifying the first load memory operation, and is configured to store a first value indicative of a number of instruction operations between a first store memory operation and the first load memory operation. The first store memory operation interfered with the first load memory operation during a previous execution. The STLF predictor is configured to generate, from the first value and the first tag, a second tag identifying the first store memory operation responsive to receiving the first indication of the first load memory operation. Coupled to receive an indication of a dependency of the first load memory operation on the first store memory operation, the indication generated in response to the second tag, the scheduler is configured to inhibit scheduling of the first load memory operation for execution prior to scheduling the first store memory operation.

Moreover, a method is contemplated. A load memory operation is executed. An interference of the load memory operation by a store memory operation is detected. A dependency table is updated with a first value indicative of a number of instruction operations between the load memory operation and the store memory operation responsive to the detecting of the interference.

BRIEF DESCRIPTION OF THE DRAWINGS

Other objects and advantages of the invention will become apparent upon reading the following detailed description and upon reference to the accompanying drawings in which.

Figure 1:
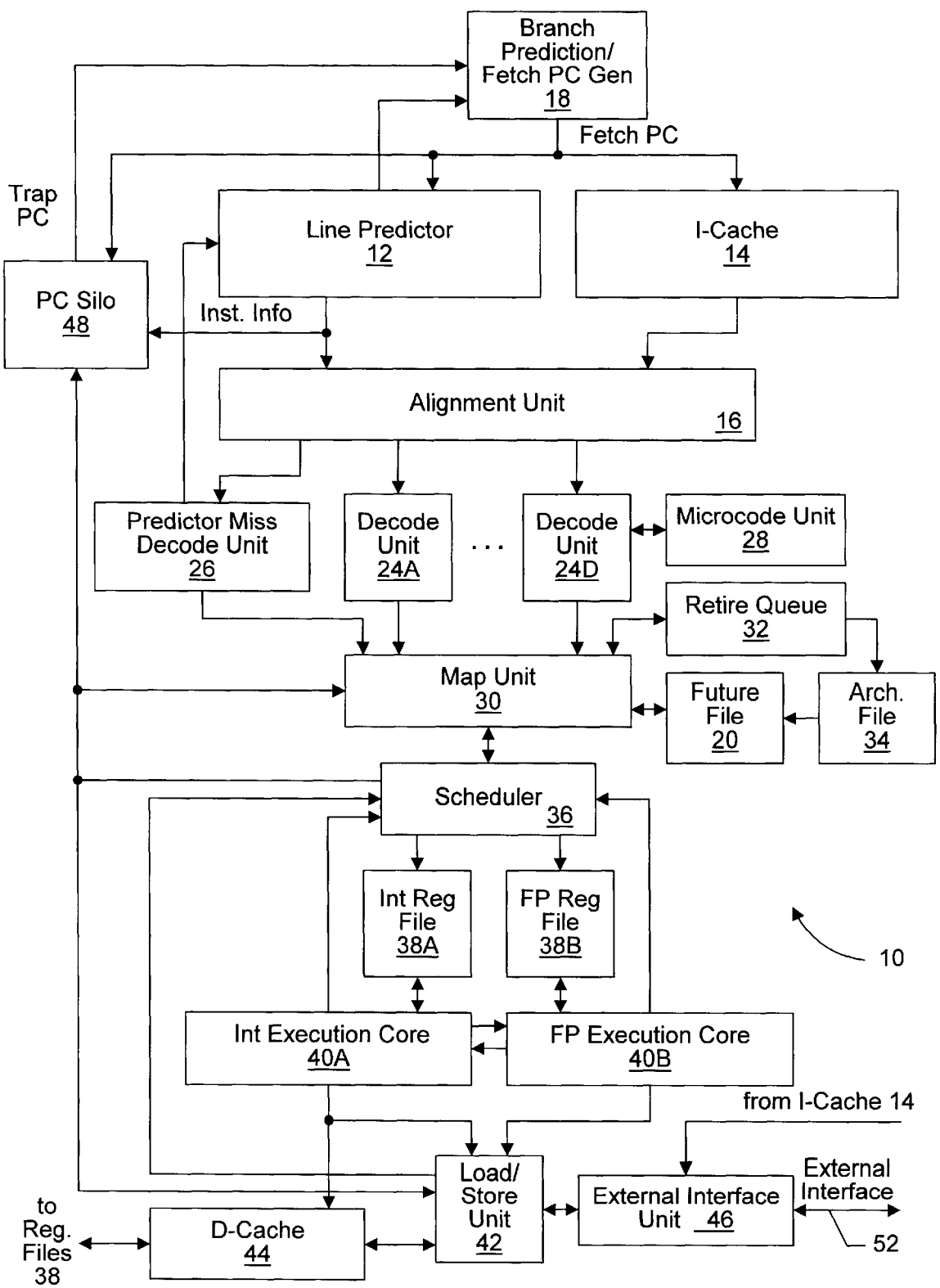
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache .14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24D decode the instructions provided thereto, and each decode unit 24A–24D generates information identifying one or more instruction operations (or ROPs) corresponding to the instructions. In one embodiment, each decode unit 24A–24D may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, map unit 30 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by map unit 30. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBS). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
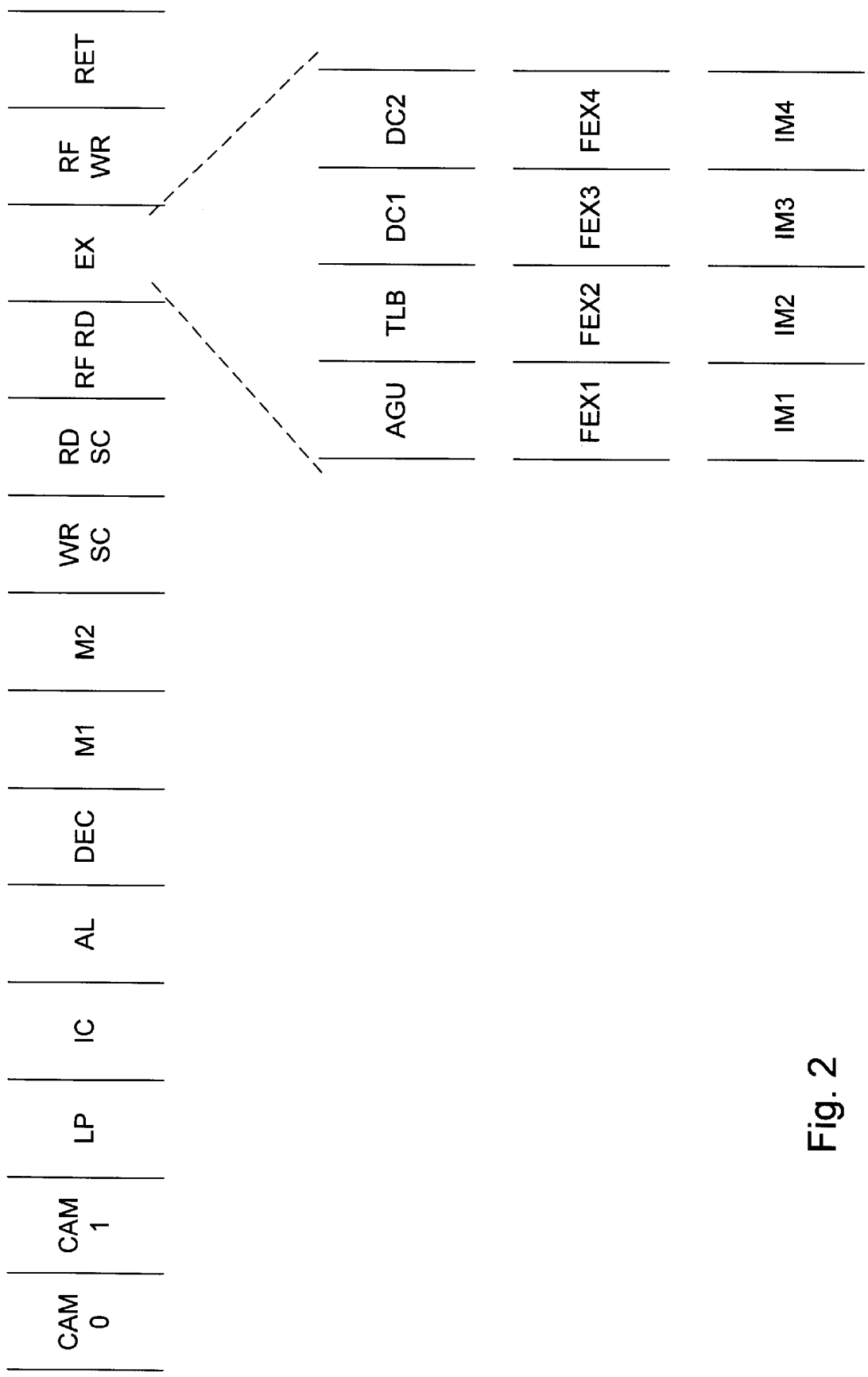
FIG. 2 is a pipeline diagram of an exemplary pipeline which may be employed in the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Store to Load Forwarding

Figure 3:
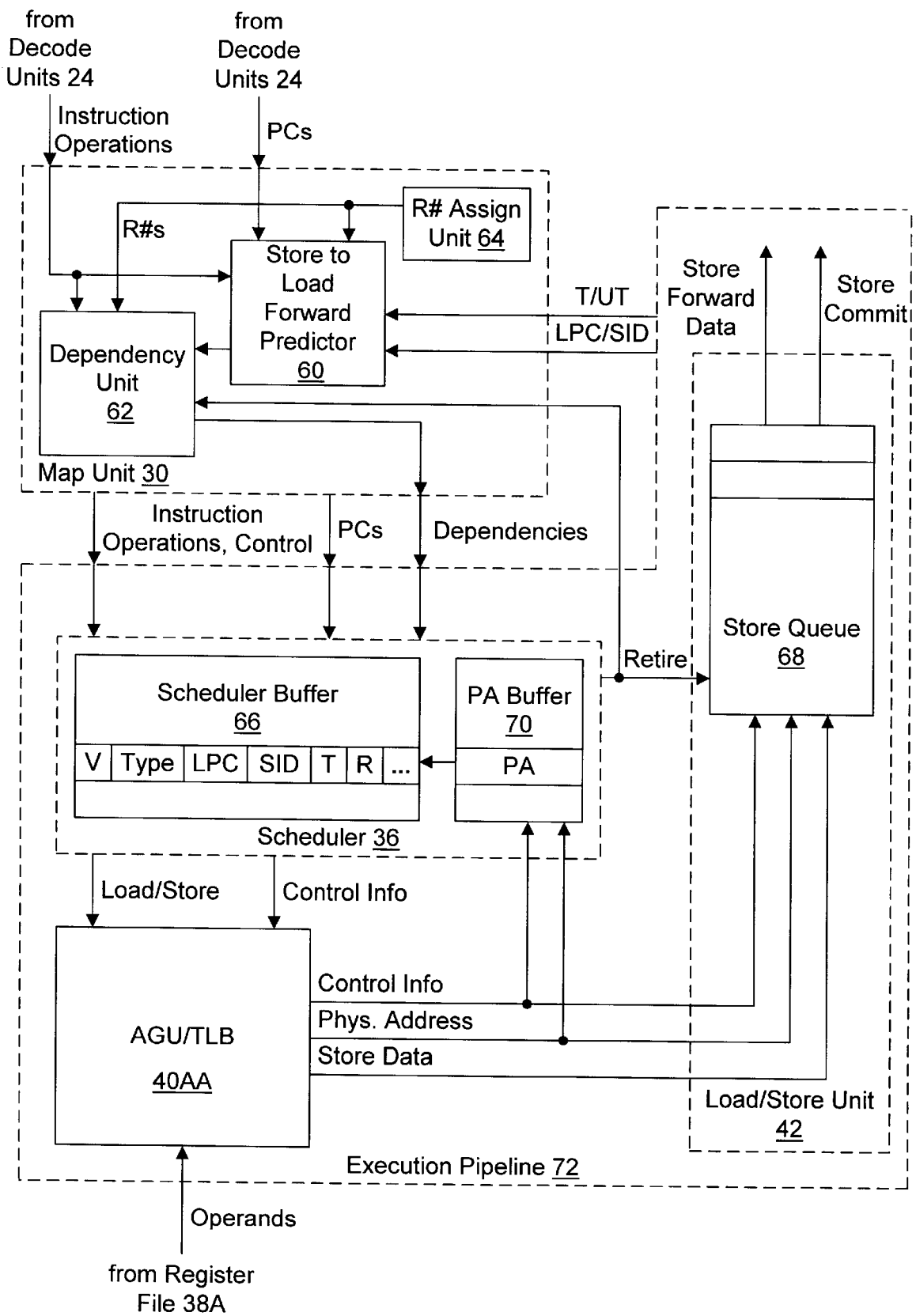
FIG. 3 is a block diagram illustrating one embodiment of a map unit, a scheduler, an AGU/TLB, and a load/store unit in greater detail.

Turning now to FIG. 3, a block diagram illustrating one embodiment of map unit 30, scheduler 36, an address generation unit/translation lookaside buffer (AGU/TLB) 40AA, and load/store unit 42 in greater detail is shown. Other embodiments are possible and contemplated. In the embodiment of FIG. 3, scheduler 36, AGU/TLB 40AA, and load/store unit 42 are collectively referred to as execution pipeline 72. Map unit 30 includes a store to load forward (STLF) predictor 60, a dependency unit 62, and an R# assign unit 64 (which assigns R#s to instruction operations). Scheduler 36 includes a scheduler buffer 66 and a physical address (PA) buffer 70. Load/store unit 42 includes a store queue 68. Map unit 30 is coupled to receive instruction operations and corresponding program counter addresses (PCs) from decode units 24, a retire signal from scheduler 36, and a train/untrain interface (including train/untrain (T/UT) signals, a load PC (LPC) and a store identifier (SID) from execution pipeline 72. Map unit 30 is coupled to provide the instruction operations, PCs, and dependency information to scheduler 36. More particularly, STLF predictor 60 is coupled to receive the instruction operations, PCs, R#s from R# assign unit 64, and train/untrain interface and to provide information regarding load dependencies on stores to dependency unit 62, which is also coupled to receive the instruction operations and R#s from R# assign unit 64. Dependency unit 62 is coupled to provide the dependency information to scheduler 36. Scheduler 36 is coupled to provide loads and stores to AGU/TLB 40AA, along with corresponding control information. AGU/TLB 40AA is coupled to receive corresponding operands from register file 38A and to provide a physical address and other control information to store queue 68, along with, in the case of a store, store data. Additionally, AGU/TLB 40AA is coupled to provide the physical address and control information to PA buffer 70, which is coupled to scheduler buffer 66. Store queue 68 is coupled to receive a retire signal from scheduler 36 and to provide a store to commit and store forward data to D-cache 44. In one embodiment, AGU/TLB 40AA is part of integer execution core 40A.

Generally, instruction operations are received by map unit 30 from decode units 24. For each load memory operation, STLF predictor 60 determines if it has any information indicating that, during a previous execution, a store memory operation interfered with the load memory operation. If a store memory operation did interfere, STLF predictor 60 provides an indication of that store memory operation to dependency unit 62. Dependency unit 62 indicates a dependency for the load memory operation on that store memory operation (in addition to any dependencies for address operands, etc.), and thus the load memory operation does not get scheduled prior to the store memory operation. Accordingly, during the current execution of the load memory operation, the store memory operation may not interfere. On the other hand, if no information regarding interference from a store memory operation is recorded by STLF predictor 60 for a particular load memory operation, STLF predictor 60 does not indicate a dependency to dependency unit 62. The particular load memory operation may receive dependencies for source register operands but not for any store memory operations.

As used herein, a store memory operation "interferes" with a load memory operation if the store memory operation causes additional clock cycles to be added to the execution of the load memory operation. The additional clock cycles may be added in the form of pipeline stalls or may be added via reexecution of the load memory operation. The remainder of this disclosure will focus on an embodiment in which a store memory operation interferes with a load memory operation if the store memory operation is older than the load memory operation, the load memory operation has a dependency on the store memory operation, and the load memory operation is scheduled and/or executed prior to the store memory operation. Other embodiments are contemplated. For example, an embodiment is contemplated in which load memory operations are not scheduled prior to the address generation of a store memory operation, but which may be scheduled prior to the store data being provided. In such an embodiment, the store may interfere with the load if there is a dependency and the store data is not available when the load memory operation executes.

Map unit 30 passes the instruction operations, PCs, and dependencies to scheduler 36, which writes the instruction operations into scheduler buffer 66. Scheduler buffer 66 includes multiple entries, each entry capable of storing information regarding one instruction operation. An exemplary memory operation entry is illustrated in scheduler buffer 66, including a valid bit and a type field (identifying the entry as storing a memory operation and which type of memory operation is stored, either load or store). For load memory operations, the PC of the load memory operation (LPC) is stored. Additional information may be stored as well to aid in training STLF predictor 60 with information regarding a store memory operation which interferes with the load memory operation. For example, a store ID field (SID) may be included to store an indication of the store memory operation which has interfered with the load memory operation during the present execution, and a retry indication (R) indicating that the load memory operation has been retried (due to the interference by the store memory operation) and thus is to be rescheduled for re-execution. A train indication (T) is also stored to indicate that the load was detected, by STLF predictor 60 on dispatch of the load to scheduler 36, as being dependent on an older store. In one embodiment, the retry indication may be a bit indicating retry when the bit is set. Similarly, the train indication may be a bit indicating that the dependency was detected when set. The opposite sense may be used, and other encodings may be used, in other embodiments. Still further, additional information may be stored as desired (e.g. size information, operand PR#s, etc.), and other types of entries (e.g. integer, floating point, etc.) may have different formats. Scheduler 36 schedules the memory operation for execution subsequent to each of its recorded dependencies being satisfied.(including any dependencies identified by STLF predictor 60), and conveys the load/store nature of the operation and other control information to AGU/TLB 40AA.

More particularly, since scheduler 36 may schedule a memory operation for execution once each of its recorded dependencies are satisfied, younger loads may be scheduled prior to older stores if STLF predictor 60 does not indicate a dependency of the younger load on the older store. Map unit 30 may detect each source register operand dependency, but may not be capable of detecting all load dependencies on earlier stores. The dependency of a load on a store is based on the memory addresses affected by the load and store, respectively, generated from source operands of the load and store during execution of the load and store. STLF predictor 60 detects certain dependencies of loads on stores (as described herein), but others may not be detected. Accordingly, processor 10 employs PA buffer 70 as described below to detect cases in which a younger store scheduled prior to an older store is dependent on the older store.

AGU/TLB 40AA receives the memory operation and operands (read from register file 38A in response to PR#s from scheduler 36). AGU/TLB 40AA adds the operands to produce a virtual address, and translates the virtual address to a physical address using translations cached in the TLB. AGU/TLB 40AA provides the physical address and other control information to store queue 68. Store data is also provided, if the operation is a store. Among the control information provided by. AGU/TLB 40AA may be the load or store nature of the operation. The physical address and other control information is also provided by AGU/TLB 40AA to D-cache 44 and to PA buffer 70.

PA buffer 70 is used in the present embodiment to detect stores which interfere with loads. PA buffer 70 includes multiple entries, one entry for each entry in scheduler buffer 66. Each entry is capable of storing physical address information. When a load is executed, the physical address provided to PA buffer 70 is stored into an entry corresponding to the scheduler buffer entry storing the load. On the other hand, when a store is executed, the physical address is compared to the physical addresses stored in PA buffer 70. If a match is found, and the corresponding instruction operation is a load which is younger than the store, then the load is retried. Generally, a memory operation is referred to herein as "retried" if the operation's state within scheduler 36 is reset to a not executed state. Retrying the memory operation subsequently leads to the memory operation being rescheduled and reexecuted.

If a retry situation is detected in PA buffer 70, the retry indication in the corresponding scheduler buffer entry is set. Additionally, the store ID used by STLF predictor 60 to identify the store is stored in the scheduler buffer entry's SID field. In one embodiment, the store ID may be the store PC. In another embodiment, the store ID may be the R# of the store or the difference between the R# of the store and the R# of the load (the delta R#). Embodiments using each store ID are described in more detail below. Subsequently, when the load is rescheduled and reexecuted, the retry indication being set causes execution pipeline 72 to train the load and the corresponding store into STLF predictor 60 using the train/untrain interface (so that subsequent executions may avoid the retry of the load by making the load dependent on the store). More particularly, a train signal within the interface may be asserted, and the load PC and the store ID from the corresponding scheduler entry are provided to STLF predictor 60 as well. It is noted that the training may occur from any stage of the execution pipeline 72, according to design choice.

By indicating a dependency of the load upon the store which interfered with the load during a previous execution of the load, scheduling of the load may be inhibited until after the store is scheduled. In this fashion, the dependency of the load upon the store may be detected during the first execution of the load memory operation and store data may be forwarded in response to the load memory operation. Thus, rescheduling and reexecution of the load may be avoided. Performance may be increased due to the lack of rescheduling and reexecution of the load.

On the other hand, if the load is trained to be dependent on a store and there is no actual dependency during an execution, performance may be lost due to the delayed scheduling of the load. Accordingly, execution pipeline 72 may detect these situations as well and use the train/untrain interface to untrain the load and corresponding store from STLF predictor 60. More particularly, if a load is scheduled and its train indication in scheduler buffer 66 is set, execution pipeline 72 determines if the load receives forwarded data from store queue 68. If no forwarding occurs, then a dependency on a store may not have been warranted for the load. Accordingly, execution pipeline 72 may assert an untrain signal and provide the load PC to STLF predictor 60. STLF predictor 60 may untrain the information corresponding to the load.

As used herein, the term "train" refers to storing information which identifies the occurrence of a store which interferes with a load, and may include updating information which indicates the likelihood of the interference recurring (e.g. if the situation has occurred repeatedly in the past, it may be more likely to occur again). Thus, training may include creating a stronger correlation between the load and the store. The term "untrain" refers to deleting information which identifies the occurrence of a store interfering with a load, and may include creating a weaker correlation between the load and the store prior to deleting the information.

It is noted that the training and untraining of STLF predictor 60 may occur from any pipeline stage, and training may be performed at a different stage than untraining. For example, in the present embodiment, training is performed in response to the retry indication when the load is rescheduled, and thus could be performed at any stage after the scheduler read stage in FIG. 2. Untraining is performed in response to the train indication and the lack of store forwarding for the load, and thus may occur later in the pipeline (e.g. the DC2 stage in FIG. 2).

Returning to the execution of memory operations, if the memory operation is a store, store queue 68 stores the information provided by AGU/TLB 40AA. On the other hand, if the memory operation is a load, store queue 68 compares the load information to the information in the store queue entries. If a hit on a store queue entry is detected, the corresponding store queue data is read and provided to D-cache 44 for forwarding (store forward data in FIG. 3).

Store queue 68 retains the stores at least until they are retired by scheduler 36. Scheduler 36 signals store queue 68 via the retire signal to indicate retirement of one or more stores. Store queue 68 conveys the retired stores, in order, using the store commit path to D-cache 44. Thus, stores may remain in store queue 68 until they are committed to D-cache 44, which may be delayed from the retirement of the stores.

It is noted that various combinations of AGUs and TLBs are possible. For example, in one embodiment, a load AGU and a separate store AGU are contemplated. The store AGU may be coupled to a write port on store queue 68, and the load AGU may be coupled to a compare port on store queue 68. Other embodiments may include any number of AGUs for loads, stores, or loads and stores, as desired.

It is noted that, while certain details of the various units shown in FIG. 3 are illustrated, other details and features unrelated to the detection of loads hitting in the store queue may have been omitted for simplicity. For example, map unit 30 may perform register renaming, as described above with respect to FIG. 1.

In one embodiment, STLF predictor 60 operates during the map2 stage of the pipeline shown in FIG. 2 in terms of indicating dependencies for loads on earlier stores. However, STLF predictor 60 may operate at any pipeline stage prior to the selection of the load for execution, according to various embodiments.

The above description describes training during the reexecution of the load. However, alternative embodiments may perform the training at different times. For example, an alternative embodiment may train in response to detecting the retry situation (e.g. during execution of the store upon which the load is dependent).

The PCs of loads (and stores, in one embodiment) have been discussed in the context of training and untraining loads and stores in STLF predictor 60. However, it is noted that only a portion of the PC may be used in some embodiments for training and untraining loads and stores in STLF predictor 60. For example, the 10 least significant bits of the load PC and store PC may be used in one embodiment of the STLF predictor 60 described below.

As used herein the acronym "PC" is used to refer to the program counter address of an instruction. The PC is the address of the instruction in memory. In other words, the PC is the address used to fetch the instruction from memory. In embodiments in which multiple instruction operations may correspond to an instruction, the PC of the instruction is also the PC of each of the instruction operations (e.g. load and store memory operations).

It is noted that the R# is used in certain embodiments described above and below to identify instruction operations. Generally, any suitable tag may be used. The R# identifies relative program order of instruction operations, and may identify the entry in scheduler buffer 66 assigned to the instruction operations. Other embodiments may employ reorder buffer tags or any other tag to identify the instruction operations. Furthermore, R#s or tags may be assigned at any point in the pipeline of processor 10 prior to or coincident with operation of STLF predictor 60.

Figure 4:
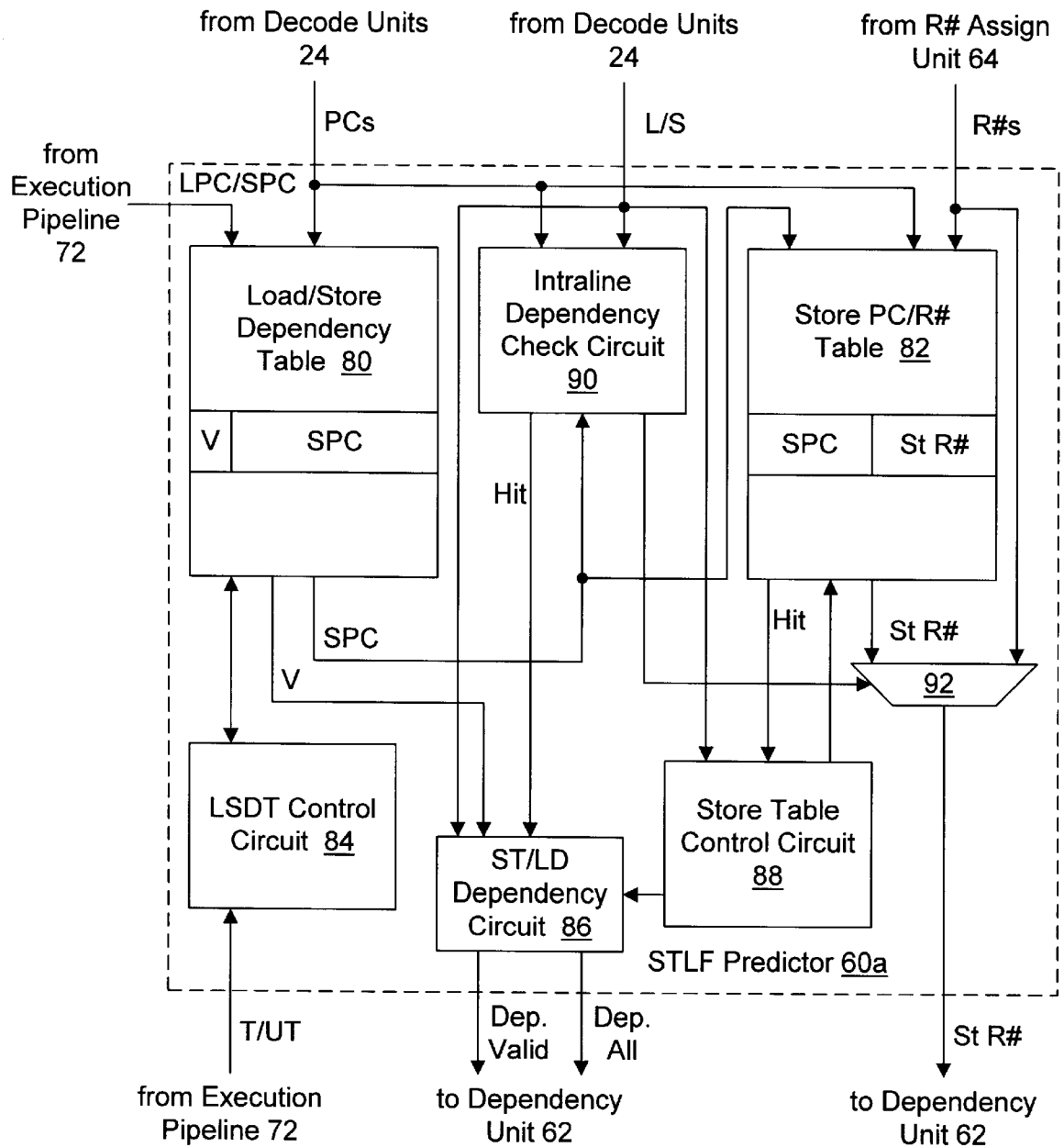
FIG. 4 is a block diagram of one embodiment of a store to load forward (STLF) predictor shown in FIG. 3.

Turning now to FIG. 4, a block diagram of a first embodiment of STLF predictor 60 (STLF predictor 60a) is shown. Other embodiments are possible and contemplated. In the embodiment of FIG. 4, STLF predictor 60a includes a load/store dependency table 80, a store PC/R# table 82, a load/store dependency table (LSDT) control circuit 84, a ST/LD dependency circuit 86, a store table control circuit 88, an intraline dependency check circuit 90, and a multiplexor (mux) 92. Load/store dependency table 80 is coupled to receive the PCs of dispatching instruction operations from decode units 24, and is coupled to LSDT control circuit 84. Additionally, load/store dependency table 80 is coupled to receive a load PC and store PC from execution pipeline 72 for training. Load/store dependency table 80 is coupled to provide store PCs to intraline dependency check circuit 90 and store PC/R# table 82, and valid indications to ST/LD dependency circuit 86. Intraline dependency check circuit 90 is coupled to receive the PCs of dispatching instruction operations and an indication of the load or store nature of each instruction operation from decode units 24, and is coupled to provide hit signals to ST/LD dependency circuit 86 and a selection control to mux 92. Store PC/R# table 82 is coupled to receive the PCs of dispatching instruction operations and the corresponding R#s assigned to the instruction operations Store PC/R# table 82 is coupled to provide store R#s to mux 92, and mux 92 is further coupled to receive the R#s assigned to the dispatching instruction operations and to provide store R#s to dependency unit 62. Store PC/R# table 82 is coupled to provide hit signals to store table control circuit 88 and is coupled to receive control information from store table control circuit 88. ST/LD dependency circuit 86 is coupled to store table control circuit 88 and is coupled to provide dependency valid and depend all signals to dependency unit 62. LSDT control circuit 84 is coupled to receive train/untrain signals from execution pipeline 72.

Generally, load/store dependency table 80 is indexed by a load PC to select one of multiple entries. The entry stores a valid indication and a store PC (SPC in FIG. 4) of a store which may have interfered with that load during a prior execution. The store PC/R# table includes multiple entries which store the store PC of recently dispatched stores; along with the corresponding R# for that store. If the store PC from the entry selected in load/store dependency table 80 hits in store PC/R# table 82, a dependency of the load on the store is noted for the load. In this manner, the load is prevented from scheduling (and thus executing) ahead of the store. Accordingly, the interference may be avoided during the present execution.

More particularly, as instruction operations are dispatched, the PCs of the instruction operations are used to index into load/store dependency table 80. The remainder of this discussion will focus on the response of STLF predictor 60a to one input PC corresponding to one dispatching instruction operation, unless otherwise noted. However, it is noted that STLF predictor 60a may respond in parallel to each PC of each dispatching instruction operation. Responsive to the input PC, load/store dependency table 80 outputs a valid indication and a store PC from the indexed entry. The store PC is input to store PC/R# table 82, and is compared to the store PCs stored in store PC/R# table 82. For example, store PC/R# table 82 may comprise a content addressable memory (CAM). Store PC/R# table 82 outputs hit signals for each entry, indicating whether or not that entry is hit by the store PC. Store table control circuit 88 receives the hit signals and selects the youngest store represented in store PC/R# table 82 which is hit by the store PC. The selected entry outputs a store R# to mux 92, which generally selects that store R# to output to dependency unit 62.

Additionally, store table control circuit 88 signals ST/LD dependency circuit 86 with an indication of whether or not a hit was detected in store PC/R# table 82 for that instruction operation. ST/LD dependency circuit 86 provides a dependency valid signal to dependency unit 62. The dependency valid signal, if asserted, indicates that dependency unit 62 is to record a dependency for the instruction operation on the store identified by the store R# provided by mux 92. If the dependency valid signal is deasserted, the signal indicates that no dependency is to be recorded by dependency unit 62. More particularly in one embodiment, ST/LD dependency circuit 86 may assert the dependency valid signal if: (i) the instruction operation is a load (determined from the load/store indications from decode units 24); (ii) if the valid indication from the indexed entry of load/store dependency table 80 indicates valid; and (iii) if the store PC from the indexed entry hits in store PC/R# table 82.

Processor 10 as shown in FIG. 1 attempts to dispatch multiple instruction operations per clock cycle. Thus, it is possible that the youngest store which matches the store PC provided from load/store dependency table 80 is being concurrently dispatched with the corresponding load. Accordingly, for a given instruction operation, intraline dependency check circuit 90 compares the store PC output from load/store dependency table 80 to the PCs of each concurrently dispatched instruction operation which is prior to the given instruction operation in program order. If the prior instruction operation's PC matches the store PC from load/store dependency table 80 and the prior instruction operation is a store (indicated by the load/store indications provided by decode units 24), intraline dependency check circuit 90 may: (i) indicate a hit to ST/LD dependency circuit 86 for the corresponding load; and (ii) control mux 92 to override the store R# provided by store PC/R# table 82 with the R# of the instruction operation upon which the hit is detected. In this manner, the store R# output to dependency unit 62 is the R# of the store which is concurrently dispatched with the load. Additionally, ST/LD dependency circuit 86 may assert the dependency valid signal for the load if: (i) the instruction operation is a load (determined from the load/store indications from decode units 24); (ii) if the valid indication from the indexed entry of load/store dependency table 80 indicates valid; and (iii) if the hit signal from intraline dependency check circuit 90 for the load is asserted.

In one embodiment, ST/LD dependency circuit 86 may further assert the depend all signal for the instruction operation. The depend all signal, if asserted, indicates to dependency unit 62 to record dependencies for the instruction operation on each outstanding (dispatched and not retired) store. The depend all signal is used to handle a situation in which a particular entry is repeatedly trained with store PCs of stores which interfere with loads. Since load/store dependency table 80 selects an entry in response to a PC of an instruction operation and the entry stores one store PC, loads for which different stores interfere on different executions may still be interfered with even though STLF predictor 60a indicates a dependency on a store. To better handle such cases, the valid indication in load/store dependency table 80 may be a bit vector. Each time an entry is trained by execution pipeline 72, a bit in the bit vector may be placed in the valid state (e.g. set or clear, depending upon design choice). If each of the bits is in the valid state, the entry may be repeatedly being trained because the load is being interfered with by different stores during various executions. Accordingly, the depend all signal may be asserted if: (i) each bit in the bit vector is in the valid state; and (ii) the instruction operation is a load. One embodiment of the bit vector and placing bits in the valid or invalid state is described in more detail below.

The above has described the use of STLF predictor 60a to indicate dependencies for loads on stores which may have interfered with the loads on prior executions. Additionally, STLF predictor 60a may be trained with the information on the loads and stores. Store PC/R# table 82 stores the store PCs and R#s of the most recently dispatched stores. Thus, store table control circuit 88 may allocate entries in store PC/R# table 82 to stores which are being dispatched. Store table control circuit 88 receives the load/store indications for each instruction operation from decode units 24 and allocates entries to each dispatching store. The allocated entries are updated with the store PC (received from decode units 24) and the corresponding R# (received from R# assign unit 64). In one embodiment, store table control circuit 88 may operate store PC/R# table 82 as a first-in, first-out (FIFO) buffer of the most recently dispatched stores. Thus, once store PC/R# table is filled with stores, subsequently dispatched stores displace the oldest stores within store PC/R# table 82. Additionally, it is possible that a store may retire prior to being deleted from PC/R# table 82 via subsequently dispatched stores. Accordingly, store table control circuit 88 may receive the R#s of retiring stores and may delete entries having the corresponding R#.

Load/store dependency table 80 is trained in response to the train/untrain interface from execution pipeline 72. More particularly, if the train signal is asserted by execution pipeline 72, LSDT control circuit 84 causes load/store dependency table 80 to be updated. Execution pipeline 72 provides the PC of the load to be trained (LPC in FIG. 4) and the corresponding store PC which interferes with the load as input to load/store dependency table 80. Load/store dependency table 80 updates the entry indexed by the load PC with the store PC and LSDT control circuit 84 places the valid indication into a valid state. In one embodiment, the valid indication may be a bit and the valid state may be set (or clear) and invalid state may be clear (or set). In another embodiment as described above, the valid indication may be a bit vector. In such an embodiment, LSDT control circuit 84 may select a bit within the bit vector and place that bit in the valid state during training.

Additionally, LSDT control circuit 84 may untrain an entry in response to the assertion of the untrain signal by execution pipeline 72. Again, execution pipeline 72 may provide the load PC of the load to be untrained, but the store PC may be a don't care in the untraining case. Load/store dependency table 80 indexes the entry indicated by the load PC, and LSDT control circuit 84 causes the valid indication in the indexed entry to be placed in the invalid state. In an embodiment employing a valid bit as a valid indication, the bit may be cleared (or set) to indicate invalid. In an embodiment employing the above-described bit vector, a selected bit may be placed in the invalid state. The entry may still remain valid in the bit vector case if other bits remain in the valid state. However, multiple untrain events may eventually cause each of the other bits to become invalid as well.

As mentioned above with respect to FIG. 3, while PCs have been described as indexing load/store dependency table 80 and being stored in load/store dependency table 80 and store PC/R# dependency table 82, various embodiments may index with and/or store only a portion of the PCs. The portion used to index load/store dependency table 80 may be determined by the number of entries employed within the table. For example, in one particular implementation load/store dependency table 80 may be 1K entries and thus 10 bits of the PC may be used as an index (e.g. the least significant 10 bits). The number of entries may generally be selected as design choice based, in part, on the area occupied by the table versus the accuracy of the table in general for the loads in targeted software. The number of bits used for the store PCs stored in load/store dependency table 80 and store PC/R# dependency table 82 may differ from the number of bits used in the index, and again may be selected as design choice based, in part, on the area occupied by the tables versus the accuracy of the tables in general for the loads in targeted software. In one particular implementation, the least significant 10 bits of the store PC are stored.

Furthermore, the number of entries in store PC/R# table 82 may be a matter of design choice as well, based, in part, on the area occupied by the table versus the accuracy of the table in general for the loads in targeted software. In one particular implementation, 8–12 entries may be used.

It is noted that, while the above embodiment may respond to each PC of each dispatching instruction operation, other embodiments may limit the number of concurrent instruction operations to which STLF predictor 60a responds. In such embodiments, the PCs and R#s input to STLF predictor 60a may be muxed in response to the load/store indications from decode units 24, such that only the PCs of loads are input to load/store dependency table 80 and only the PCs of stores are input to store PC/R# table 82 for storage. In such an embodiment, predictor miss decode unit 26 may terminate a line of instruction operations once the load and/or store limit is reached.

It is noted that, as an alternative to the bit vector used for the valid indication and the depend all signal for handling loads which are interfered with by different stores on different executions, each entry in load/store dependency table 80 may provide storage for multiple store PCs and corresponding valid bits. Each store PC from a selected entry may be compared to store PC/R# table 82 and a dependency may be recorded for the load on each store which is a hit in store PC/R# table 82.

Figure 5:
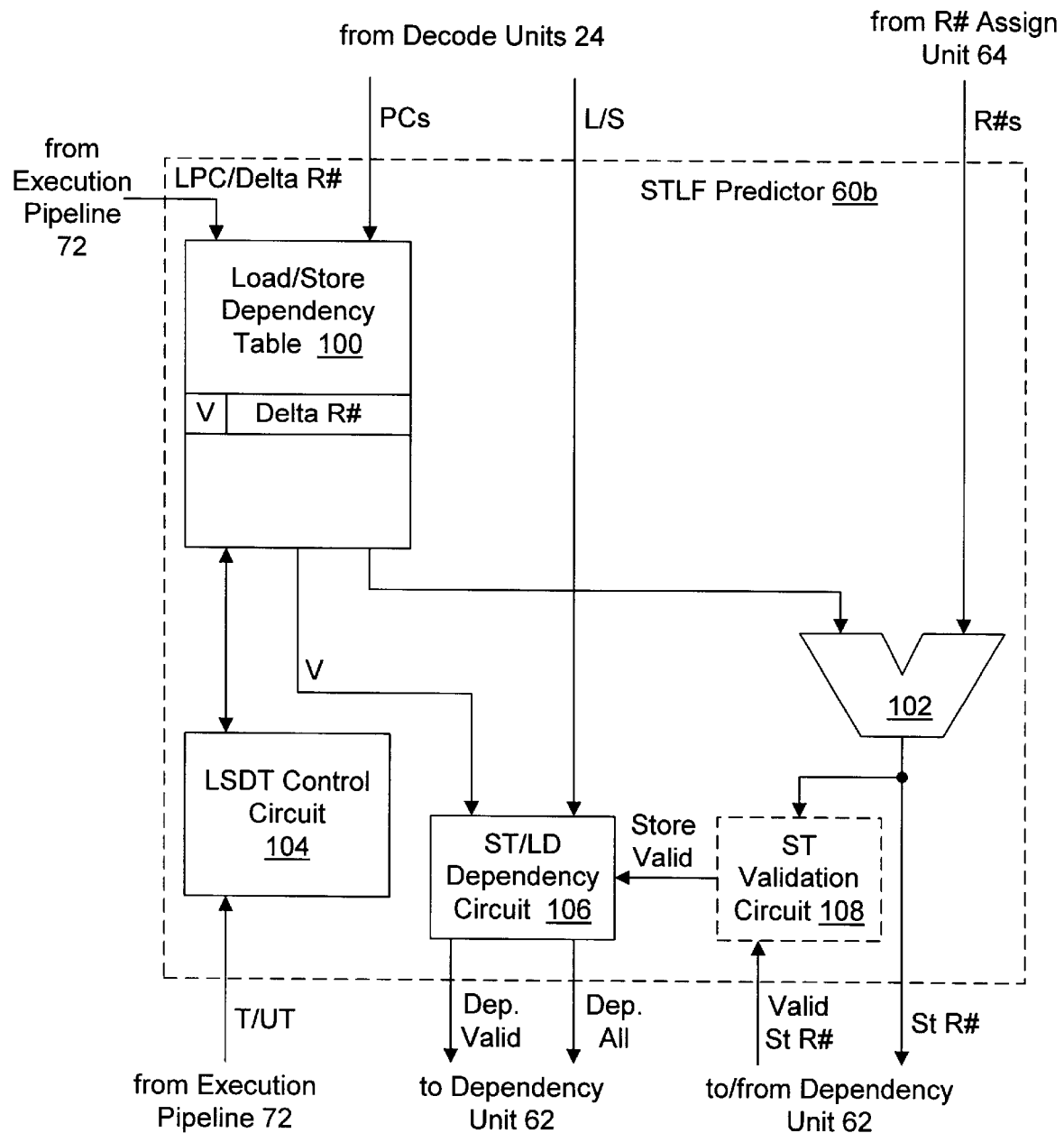
FIG. 5 is a block diagram of a second embodiment of an STLF predictor shown in FIG. 3.

Turning now to FIG. 5, a second embodiment of STLF predictor 60 (STLF predictor 60b) is shown. Other embodiments are possible and contemplated. In the embodiment of FIG. 5, STLF predictor 60b includes a load/store dependency table 100, an adder circuit 102, a load/store dependency table (LSDT) control circuit 104, a ST/LD dependency circuit 106, and an optional store validation circuit 108. Load/store dependency table 100 is coupled to receive PCs of dispatching instruction operations from decode units 24, and is further coupled to receive a load PC and delta R# from execution pipeline 72. Additionally, load/store dependency table 100 is coupled to LSDT control circuit 104 and is coupled to provide valid indications to ST/LD) dependency circuit 106 and delta R#s to adder circuit 102. Adder circuit 102 is further coupled to receive R#s of the dispatching instruction operations from R# assign unit 64. Adder circuit 102 is coupled to provide store R#s to dependency unit 62 and to store validation circuit 108, which is coupled to receive a valid store R# indication from dependency unit 62. Store validation circuit 108 is coupled to provide store valid signals to ST/LD dependency circuit 106, which is further coupled to receive load/store indications corresponding to the dispatching instruction operations from decode units 24. ST/LD dependency circuit 106 is coupled to provide dependency valid signals and depend all signals to dependency unit 62. LSDT control circuit is coupled to receive train/untrain signals from execution pipeline 72.

Generally, STLF predictor 60b may respond to a dispatching load as follows. The load PC is used to index into load/store dependency table 100, thereby selecting one of multiple entries. The selected entry stores a valid indication and a delta R#. The valid indication indicates whether or not STLF predictor 60b has been trained within information regarding a load having the indexing PC, and thus whether or not the delta R# is valid. The delta R# is the difference between the R# of the load and the R# of a store which interfered with the load during a previous execution. Since instruction sequences typically do not change during execution, the difference between the R# of the load and the R# of the store during the present execution may typically be the same as the difference during the previous execution. Adder circuit 102 adds the delta R# to the R# assigned to the dispatching load to generate a store R#, which is provided to dependency unit 62. Dependency unit 62 may then record a dependency for the load on the store. In this manner, the load is prevented from scheduling (and thus executing) ahead of the store. Accordingly, the interference may be avoided during the present execution.

More particularly, as instruction operations are dispatched, the PCs of the instruction operations are used to index into load/store dependency table 100. The remainder of this discussion will focus on the response of STLF predictor 60b to one input PC corresponding to one dispatching instruction operation, unless otherwise noted. However, it is noted that STLF predictor 60b may respond in parallel to each PC of each dispatching instruction operation. Load/store dependency table 100 outputs a delta R# and valid indication from the selected entry. Adder 102 adds the delta R# to the R# corresponding to the dispatching instruction operation and thus generates a store R# which is conveyed to dependency unit 62. It is noted that adder circuit 102 may include an adder for each dispatching instruction operation, receiving the corresponding delta R# output from load/store dependency table 100 and the R# assigned to that dispatching instruction operation by R# assign unit 64.

ST/LD dependency circuit 106 receives the valid indication and an indication of whether or not the instruction operation is a load or a store from decode units 24. ST/LD dependency circuit 106 provides a dependency valid signal to dependency unit 62, similar to ST/LD dependency valid circuit 86 above. ST/LD dependency circuit 106 may assert the dependency valid signal if: (i) the instruction operation is a load (as determined from the load/store indications provided by decode units 24); and (ii) the valid indication from the indexed entry indicates valid.

Additionally, in one embodiment, STLF predictor 60b may employ store validation circuit 108. Store validation circuit 108 receives an indication of which R#s correspond to outstanding stores from dependency unit 62. In one embodiment, the indication may be a bit vector having one bit per R#, indicating whether or not the R# corresponds to a store. Store validation circuit 108 determines whether or not the R# generated by adder circuit 102 corresponds to a store, and signals ST/LD dependency circuit 106 with the store valid signal. If the store valid signal is asserted, the generated R# corresponds to a store. On the other hand, if the store valid signal is deasserted, the generated R# does not correspond to a store. For embodiments employing store validation circuit 108, an additional condition for ST/LD dependency circuit 106 to assert the dependency valid signal is that the store valid signal from store validation circuit 108 is asserted.

Again similar to ST/LD dependency circuit 86, ST/LD dependency circuit 106 may be configured to provide depend all signal in embodiments in which the valid indication is a bit vector. Operation of ST/LD dependency circuit 106 may be similar to ST/LD dependency circuit 106 in this regard.

Load/store dependency table 100 is trained in response to the train/untrain interface from execution pipeline 72. More particularly, if the train signal is asserted by execution pipeline 72, LSDT control circuit 104 causes load/store dependency table 100 to be updated. Execution pipeline 72 provides the PC of the load to be trained (LPC in FIG. 5) and the corresponding delta R# as input to load/store dependency table 100. Load/store dependency table 100 updates the entry indexed by the load PC with the delta R# and LSDT control circuit 104 places the valid indication into a valid state. In one embodiment, the valid indication may be a bit and the valid state may be set (or clear) and invalid state may be clear (or set). In another embodiment as described above, the valid indication may be a bit vector. In such an embodiment, LSDT control circuit 104 may select a bit within the bit vector and place that bit in the valid state during training.

Additionally, LSDT control circuit 104 may untrain an entry in response to the assertion of the untrain signal by execution pipeline 72. Again, execution pipeline 72 may provide the load PC of the load to be untrained, but the delta R# may be a don't care in the untraining case. Load/store dependency table 100 indexes the entry indicated by the load PC, and LSDT control circuit 104 causes the valid indication in the indexed entry to be placed in the invalid state. In an embodiment employing a valid bit as a valid indication, the bit may be cleared (or set) to indicate invalid. In an embodiment employing the above described bit vector, a selected bit may be placed in the invalid state. The entry may still remain valid in the bit vector case if other bits remain in the valid state. However, multiple untrain events may eventually cause each of the other bits to become invalid as well.

As mentioned above with respect to FIG. 4, while PCs have been described as indexing load/store dependency table 100, various embodiments may index with only a portion of the PCs. The portion used to index load/store dependency table 100 may be determined by the number of entries employed within the table. For example, in one particular implementation load/store dependency table 100 may be 1K entries and thus 10 bits of the PC may be used as an index (e.g. the least significant 10 bits). The number of entries may generally be selected as design choice based, in part, on the area occupied by the table versus the accuracy of the table in general for the loads in targeted software.

It is noted that, while in the present embodiment the delta R# is provided to STLF predictor 60b during training, other embodiments may provide the load and store R#s and the delta R# may be calculated in STLF predictor 60b. Furthermore, embodiments may either add or subtract the delta R# and the R# of the load to generate the R# of the store. Still further, an alternative configuration for store validation circuit 108 may be to look up the store R# generated by adder circuit 102 in scheduler 36 to determine if the instruction operation is a store.

Figure 6:
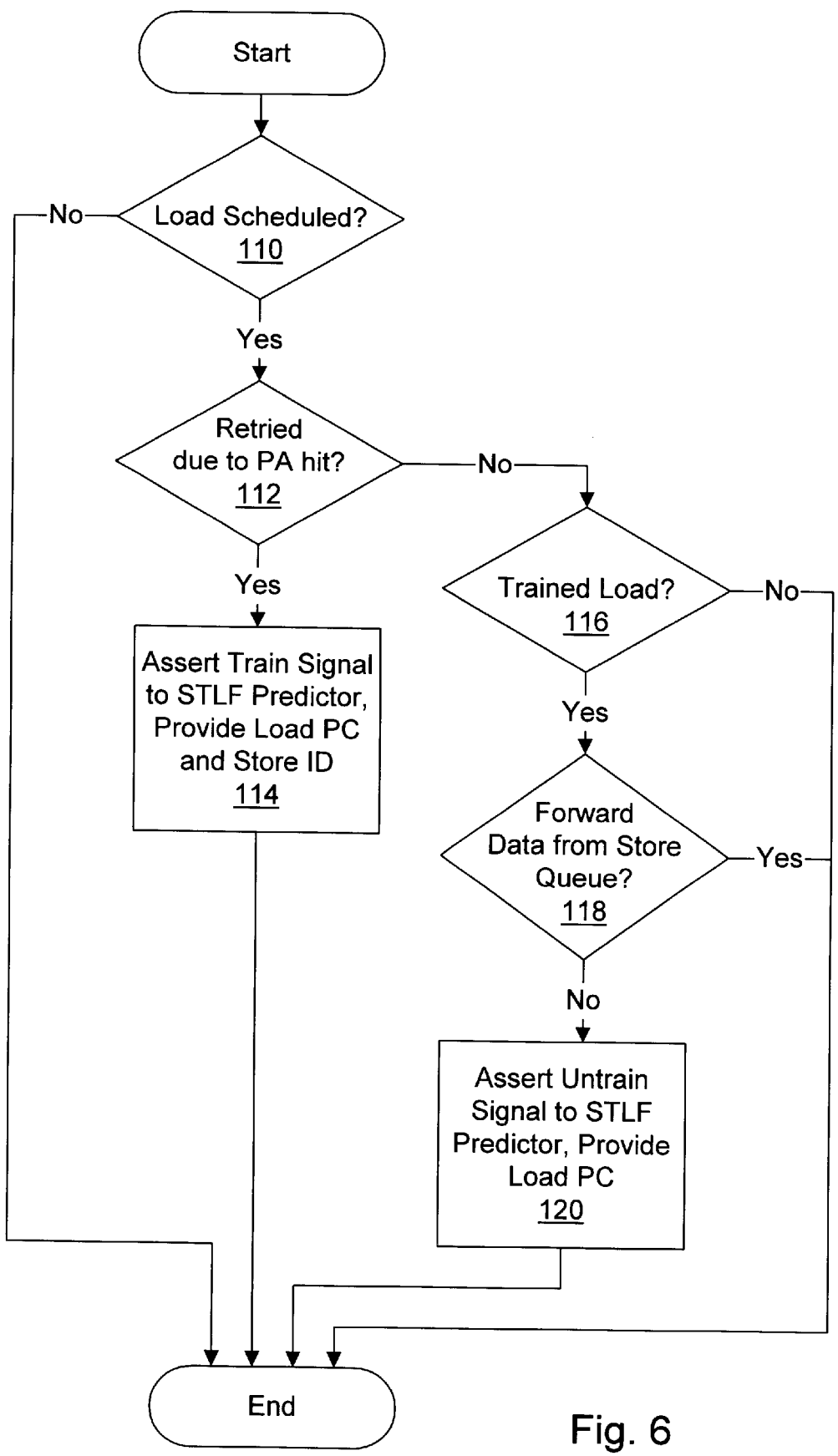
FIG. 6 is a flowchart illustrating training and untraining of loads in one embodiment of an STLF predictor shown in FIGS. 4 or 5.

Turning now to FIG. 6, a flowchart is shown illustrating operation of one embodiment of execution pipeline 72 with respect to load memory operations. Other embodiments are possible and contemplated. While the steps shown in FIG. 6 are illustrated in a particular order for ease of understanding, any suitable order may be used. Particularly, steps may be performed in parallel by combinatorial logic within execution pipeline 72. Still further, various steps may be performed at different states within execution pipeline 72. Information regarding other steps may be pipelined to the stages at which steps are performed.

Execution pipeline 72 determines if a load has been scheduled for execution (decision block 110). If a load is not scheduled, then no training operations are possible in this embodiment. If a load is scheduled, execution pipeline 72 determines if the load was retried due to a hit in physical address buffer 70 (decision block 112). More particularly, execution pipeline 72 may examine the retry indication from the scheduler buffer entry allocated to the load. If the load was retried due to a physical address buffer hit, the execution pipeline 72 asserts the train signal to STLF predictor 60 and provides the load PC and store ID of the load and store to be trained into STLF predictor 60 (block 114).

On the other hand, if the load was not retried due to a physical address buffer hit, execution pipeline 72 determines if the load received a dependency on a store due to operation of STLF predictor 60 (decision block 116). In other words, execution pipeline 72 determines if the train indication in the scheduler buffer entry allocated to the load indicates that the load was trained. If the load was trained, execution pipeline 72 determines if data is forwarded from the store queue for the load (decision block 118). If data is not forwarded, it is likely that the load would not have been interfered with by a store. Accordingly, in this case, execution pipeline 72 may assert the untrain signal to STLF predictor 60 and provide the load PC of the load for untraining (block 120).

It is noted that training may also be performed during execution of a store which interferes with a load, rather than during the reexecution of the load due to the retry.

Figure 7:
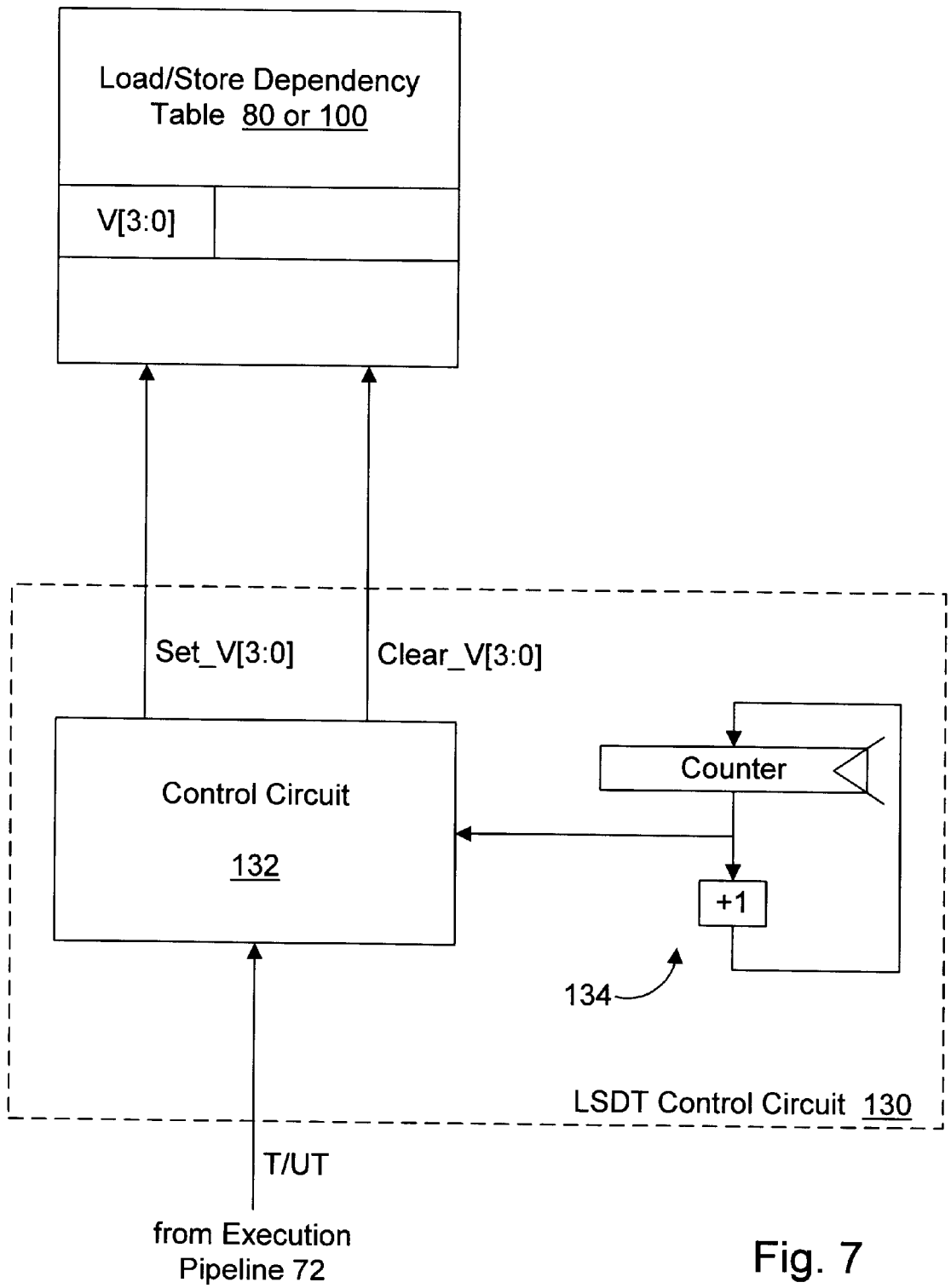
FIG. 7 is a block diagram illustrating one embodiment of a control circuit which may be employed in an STLF predictor shown in FIGS. 4 or 5.

Turning now to FIG. 7, a block diagram of a portion of one embodiment of an LSDT control circuit 130 is shown. LSDT control circuit 130 may be used as LSDT control circuit 84 and/or LSDT control circuit 104, in various embodiments. Other embodiments are possible and contemplated. In the embodiment of FIG. 7, LSDT control circuit 130 includes a control circuit 132 and a counter circuit 134 coupled to the control circuit. Control circuit 132 is coupled to receive the train and untrain signals from execution pipeline 72, and is coupled to provide Set_V[3:0] signals and Clear_V[3:0] signals to load/store dependency table 80 or 100 (depending upon the embodiment).

LSDT control circuit 130 is configured to manage the valid indications in the load/store dependency table during training and untraining for embodiments in which the valid indications are bit vectors. In the present embodiment, each bit in the bit vector is in the valid state if set and in the invalid state if clear, although alternative embodiments may have each bit in the bit vector in the valid state if clear and the invalid state if set. Still other embodiments may encode valid states in the bits.

If an entry is being trained, control circuit 132 selects a bit in the bit vector to set responsive to the value maintained by counter circuit 134. Similarly, if an entry is being untrained, control circuit 132 selects a bit in the bit vector to clear responsive to the value maintained by counter circuit 134. Each value of the counter circuit 134 selects one of the bits in the bit vector. Counter circuit 134 includes a counter register and an incrementor which increments the value in the counter register. Thus, counter circuit 134 increments each clock cycle. Accordingly, the selected bit for a given training or untraining may be pseudo-random in the present embodiment.

In the present embodiment, valid indications are 4 bit vectors. Accordingly, one signal within Set_V[3:0] and Clear_V[3:0] corresponds to each bit in the vector. If an entry is being trained, control circuit 132 asserts the Set_V[3:0] signal corresponding to the bit selected based on counter circuit 134. In response, load/store dependency table 80 or 100 sets the corresponding bit in the bit vector of the indexed entry. On the other hand, if an entry is being untrained, control circuit 132 asserts the Clear_V[3:0] signal corresponding to the bit selected based on counter circuit 134. In response, load/store dependency table 80 or 100 clears the corresponding bit in the bit vector of the indexed entry. Control circuit 132 may also provide a write enable signal to enable updating of the indexed entry, if desired.

Rather than incrementing the count each clock cycle, alternative configurations may increment the count after each train or untrain event, if desired. Still further, alternative configurations may select a bit which is in the invalid state to change to the valid state during training and may select a bit which is in the valid state to change to invalid during untraining.

Figure 8:
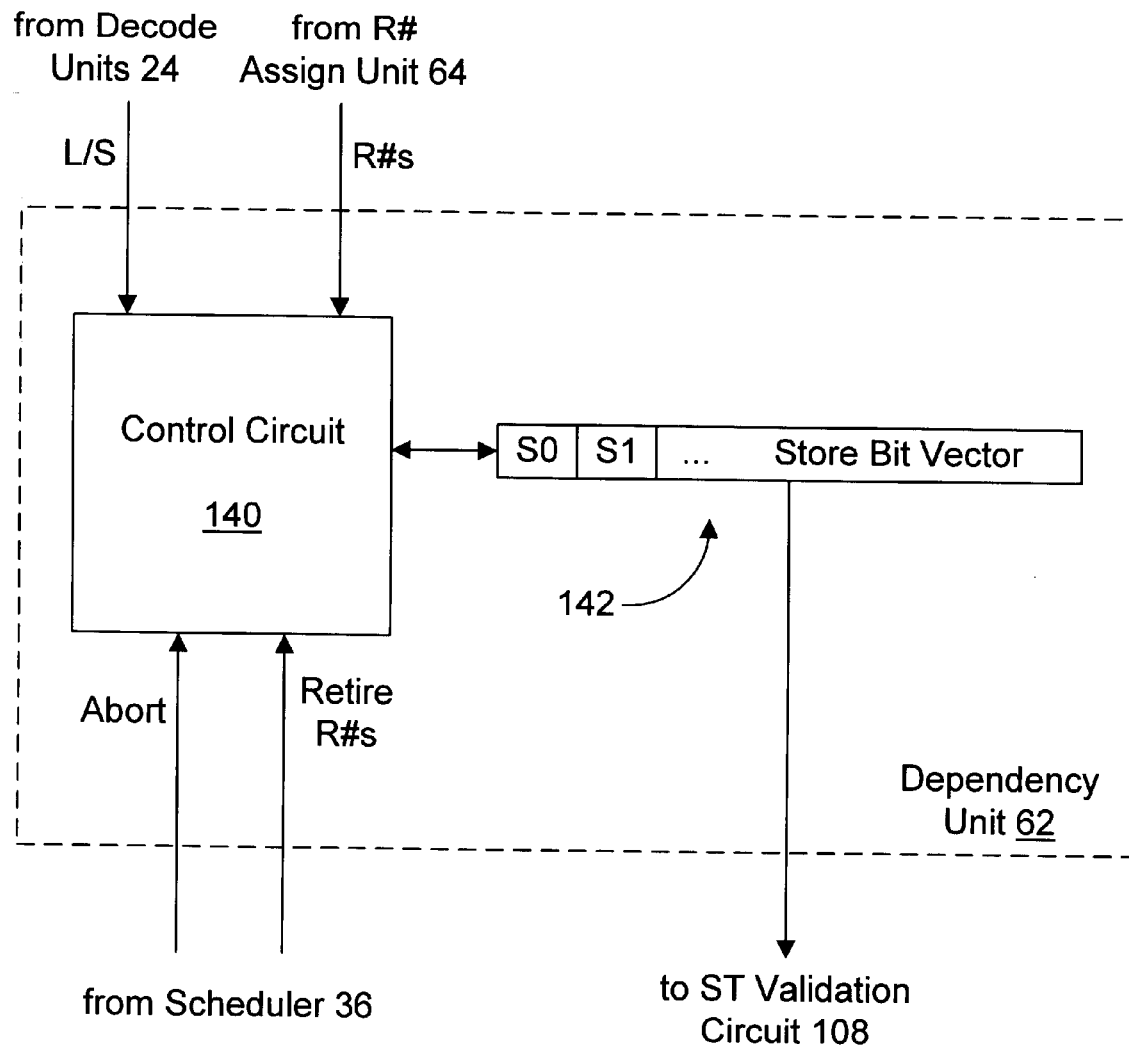
FIG. 8 is a block diagram of one embodiment of a dependency unit shown in FIG. 3.

Turning now to FIG. 8, a block diagram of a portion of one embodiment of dependency unit 62 is shown. Other embodiments are possible and contemplated. The portion illustrated in FIG. 8 may be related to maintaining a store bit vector indicating outstanding stores. Other portions (not shown) may be configured to record dependencies for instruction operations for dispatch to scheduler 36. In the embodiment of FIG. 8, dependency unit 62 includes a control circuit 140 and a bit vector storage 142 coupled to control circuit 140. Control circuit 140 is further coupled to receive an indication of the load/store nature of dispatching instruction operations from decode units 24 and assigned R#s from R# assign unit 64. Additionally, control circuit 140 is coupled to receive retired R#s and an abort indication from scheduler 36. The store bit vector from bit vector storage 142 is conveyed to store validation circuit 108.

Generally, as instruction operations are dispatched, control circuit 140 receives indications of the store memory operations from decode units 24. The corresponding R#s are provided from R# assign unit 64. The store bit vector in bit vector storage 142 includes a bit for each R#. Control unit 140 sets the bits in the store bit vector which correspond to dispatching stores. Similarly, as stores are retired by scheduler 36 and indicated via the retire R#s, control circuit 140 resets the corresponding bits in the store bit vector. Finally, if an abort is signalled, control circuit 140 resets the bits of the aborted stores. In one embodiment, aborts may be signalled when the instruction operation causing the abort is retired. Thus, the abort indication may be a signal used to clear the store bit vector. In other embodiments, the abort indication may identify the R# of the aborting instruction and only younger stores may be aborted.

As used herein, the term "control circuit" refers to circuitry which operates on inputs to produce outputs as described. Generally, a control circuit may include any combination of combinatorial logic (static or dynamic), state machines, custom circuitry, and clocked storage devices (such as flops, registers, etc.).

Computer Systems

Figure 9:
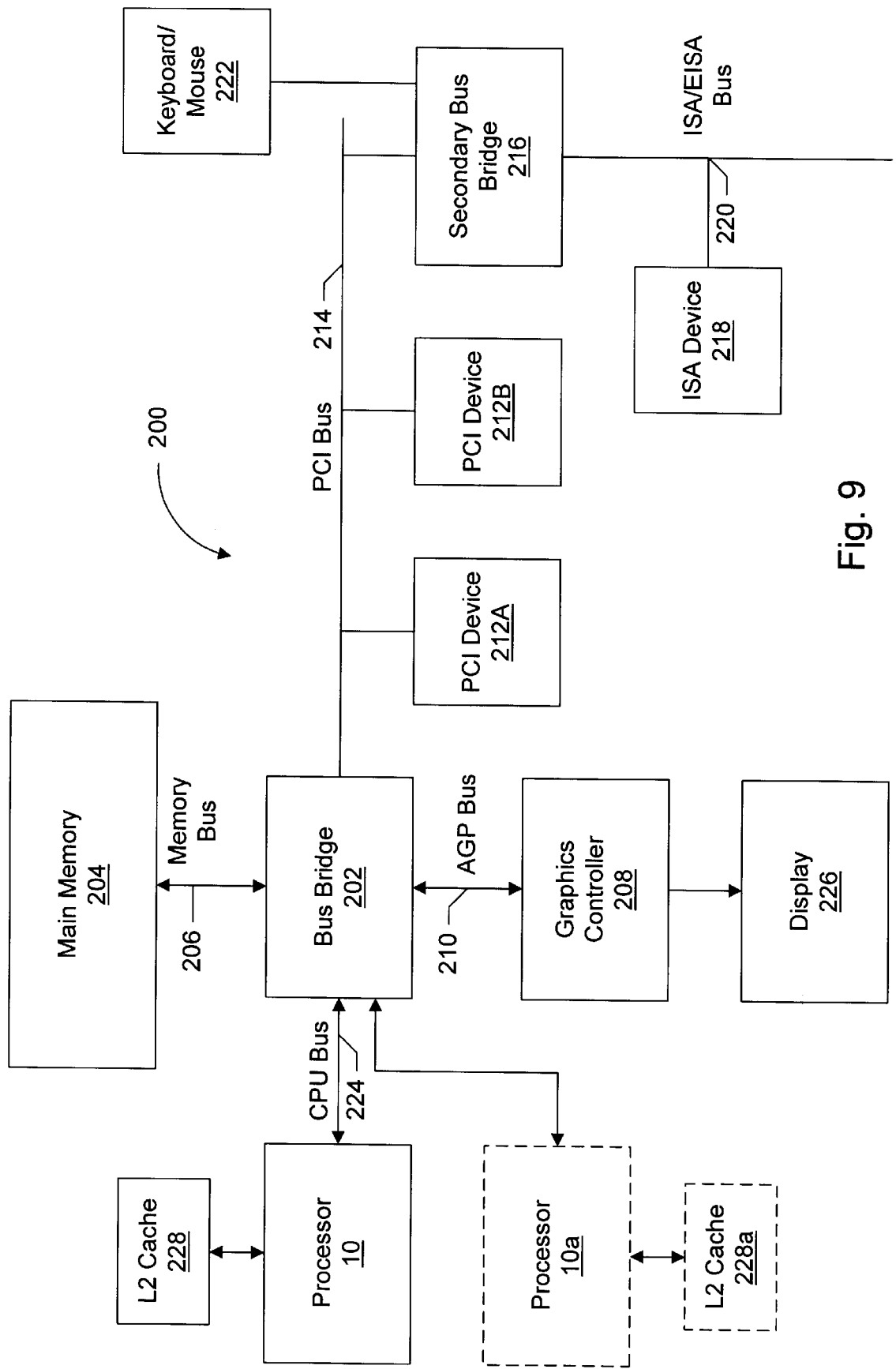
FIG. 9 is a block diagram of one embodiment of a computer system including the processor shown in FIG. 1.

Turning now to FIG. 9, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 9) or may share CPU bus 224 with processor 10. Furthermore, processor 10a may be coupled to an optional L2 cache 228a similar to L2 cache 228.

Figure 10:
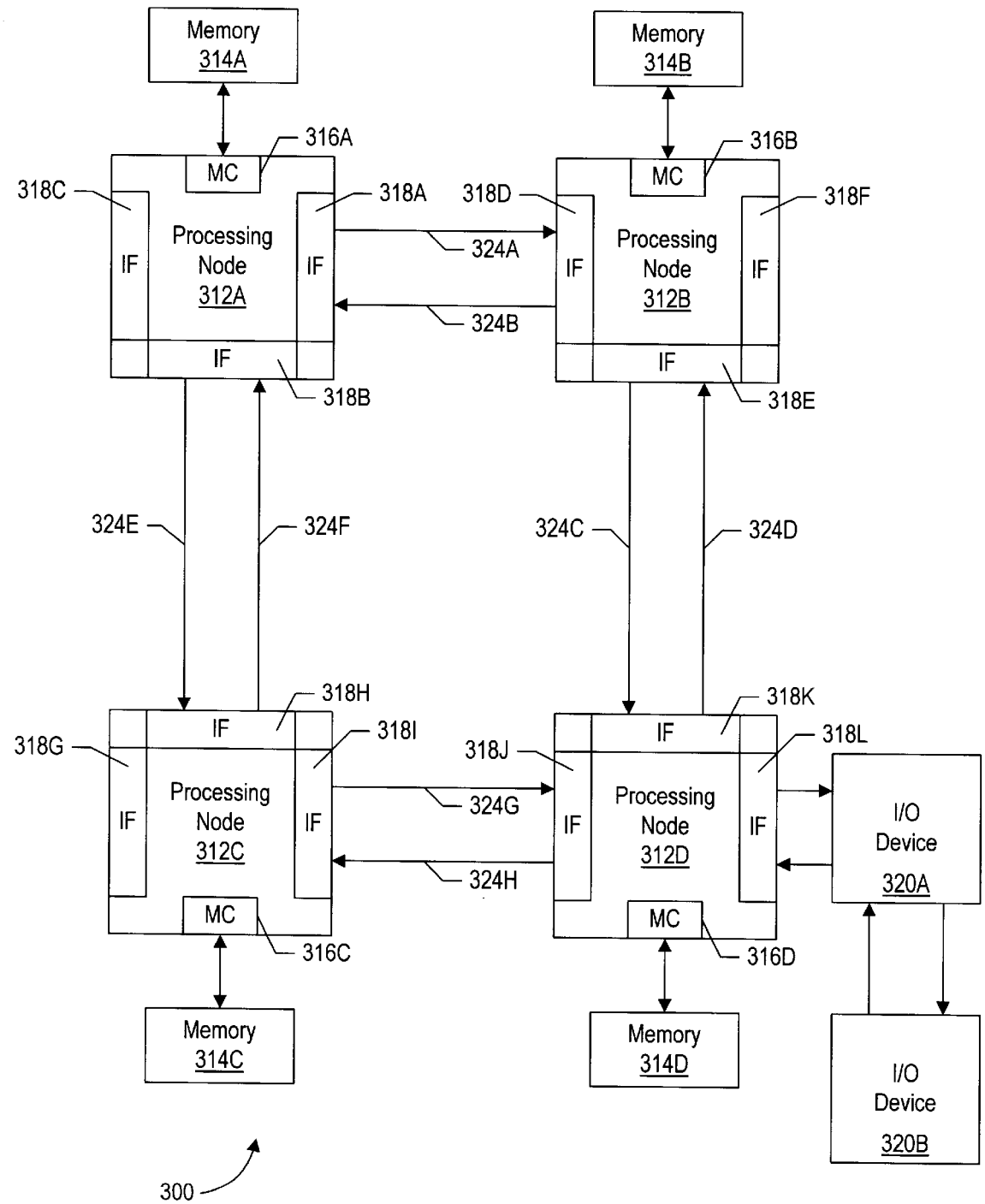
FIG. 10 is a block diagram of a second embodiment of a computer system including the processor shown in FIG. 1.

Turning now to FIG. 10, another embodiment of a computer system 300 is shown. Other embodiments are possible and contemplated. In the embodiment of FIG. 10, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 10. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 10. Any suitable routing algorithm may be used. Other embodiments of computer system 300 may include more or fewer processing nodes then the embodiment shown in FIG. 10.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A store to load forward (STLF) predictor comprising:
a dependency table configured to store a first value indicative of a number of instruction operations between a first store memory operation and a first load memory operation, wherein said first store memory operation interfered with said first load memory operation during a previous execution, and wherein said dependency table is configured to output said first value responsive to receiving a first indication of said first load memory operation; and
an adder circuit coupled to receive said first value and a first tag identifying said first load memory operation, said adder circuit configured to generate, from said first value and said first tag, a second tag identifying said first store memory operation.

2. The STLF predictor as recited in claim 1 wherein said first store memory operation interferes with said first load memory operation if said first load memory operation is executed prior to executing said first store memory operation and said first load memory operation has a dependency on said first store memory operation.

3. The STLF predictor as recited in claim 1 wherein said dependency table is further configured to output a valid indication indicative of a validity of said first value.

4. The STLF predictor as recited in claim 3 further comprising a control circuit coupled to receive said valid indication, wherein said control circuit is configured to indicate a dependency of said first load memory operation on said first store memory operation in response to said valid indication.

5. The STLF predictor as recited in claim 4 wherein said valid indication comprises a bit vector, and wherein said valid indication indicates valid if at least one bit is in a valid state.

6. The STLF predictor as recited in claim 5 wherein said control circuit is configured to indicate a dependency on each outstanding store memory operation responsive to each bit in said bit vector being in said valid state.

7. The STLF predictor as recited in claim 4 further comprising a store validation circuit coupled to receive said second tag and to verify that a particular instruction operation identified by said second tag is a store memory operation.

8. The STLF predictor as recited in claim 7 wherein said store validation circuit is coupled to receive an indication of said each outstanding store.

9. The STLF predictor as recited in claim 8 wherein said indication of said each outstanding store comprises a second bit vector having a bit for each entry in a scheduler.

10. The STLF predictor as recited in claim 10 wherein said first tag and said second tag identify entries in said scheduler.

11. The STLF predictor as recited in claim 1 wherein said first indication comprises at least a portion of a load program counter address (PC) corresponding to said first load memory operation.

12. A processor comprising:
a store to load forward (STLF) predictor coupled to receive a first indication of a first load memory operation and a first tag identifying said first load memory operation, wherein said STLF predictor is configured to store a first value indicative of a number of instruction operations between a first store memory operation and said first load memory operation, wherein said first store memory operation interfered with said first load memory operation during a previous execution, and wherein said STLF predictor is configured to generate, from said first value and said first tag, a second tag identifying said first store memory operation responsive to receiving said first indication of said first load memory operation; and
a scheduler coupled to receive an indication of a dependency of said first load memory operation on said first store memory operation, said indication generated in response to said second tag, wherein said scheduler is configured to inhibit scheduling of said first load memory operation for execution prior to scheduling said first store memory operation.

13. The processor as recited in claim 12 wherein said first store memory operation interferes with said first load memory operation if said first load memory operation is executed prior to executing said first store memory operation and said first load memory operation has a dependency on said first store memory operation.

14. The processor as recited in claim 12 wherein said STLF predictor is further configured to store a valid indication corresponding to said first value, wherein said STLF predictor is configured to indicate said dependency responsive to said valid indication.

15. The processor as recited in claim 12 wherein said STLF predictor is further configured to determine if a particular instruction operation identified by said second tag is a store memory operation, and wherein said STLF predictor is configured to indicate said dependency only if said particular instruction operation is said store memory operation.

16. A method comprising:
executing a load memory operation;
detecting an interference of said load memory operation by a store memory operation; and
updating a dependency table with a first value indicative of a number of instruction operations between said load memory operation and said store memory operation responsive to said detecting.

17. The method as recited in claim 16 further comprising:

dispatching said load memory operation;

reading said dependency table responsive to said dispatching; and inhibiting execution of said load memory operation prior to executing said store memory operation responsive to said first value.

18. The method as recited in claim 17 further comprising:

adding said first value to a first tag of said load memory operation to generate a second tag of said store memory operation; and noting a dependency of said load memory operation on said store memory operation responsive to said second tag; and said inhibiting being responsive to said noting.

19. The method as recited in claim 16 wherein said detecting is performed after said executing.

20. The method as recited in claim 19 further comprising:

executing said store memory operation subsequent to said executing said load memory operation; and said detecting said dependency during said executing said store memory operation.

* * * * *